Figure 1:
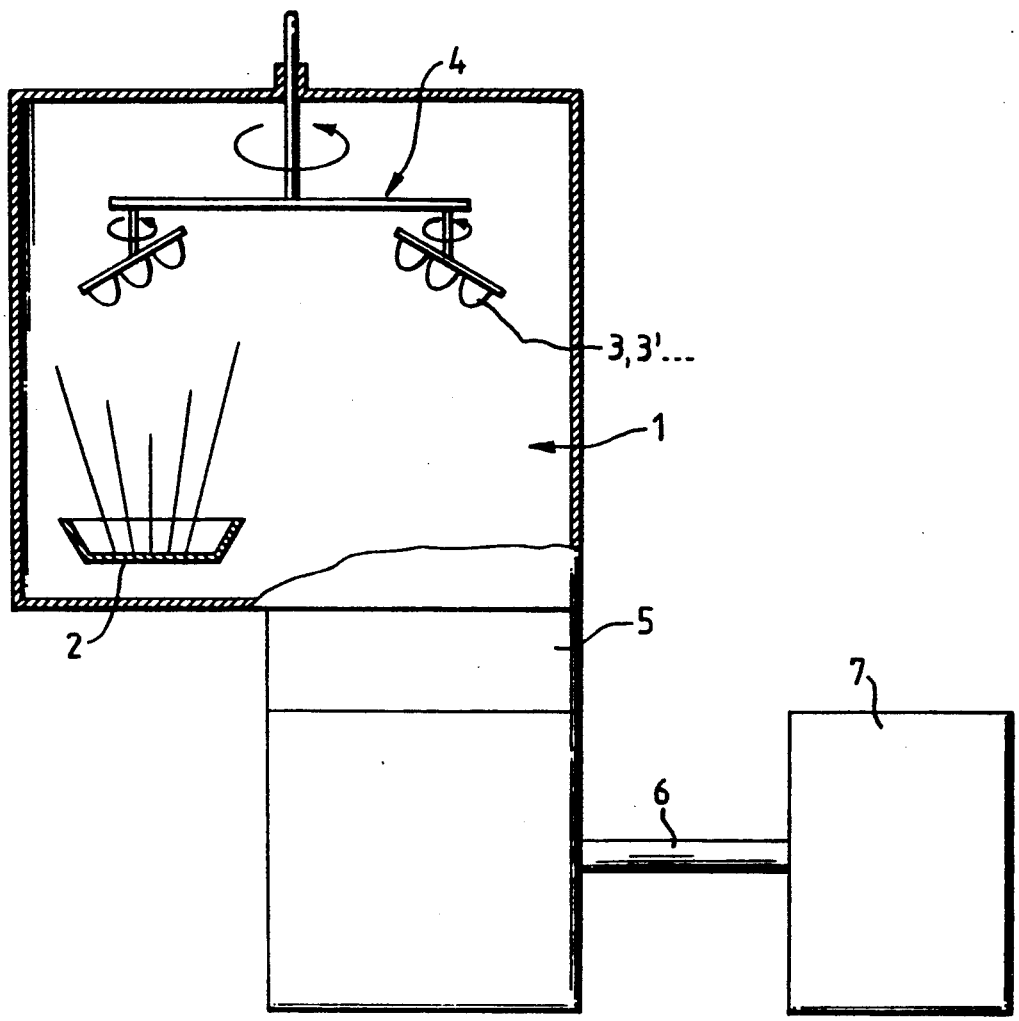

United States Patent [19]
Locher et al.

[11] Patent Number: 5,106,346
[45] Date of Patent: Apr. 21, 1992

[54] PLANETARY GEAR SYSTEM WITH A SET OF GEARS, PARTICULARLY FOR DEVICES FOR COATING SUBSTRATES

[75] Inventors: Stefan Locher, Alzenau; Eckhard Wirth, Gelnhausen, both of Fed. Rep. of Germany

[73] Assignee: Leybold Aktiengesellschaft, Hanau I, Fed. Rep. of Germany

[21] Appl. No.: 592,581

[22] Filed: Oct. 4, 1990

[30] Foreign Application Priority Data

Aug. 14, 1990 [DE] Fed. Rep. of Germany ....... 4025659

[51] Int. Cl.$^5$ .............................................. F16H 1/28
[52] U.S. Cl. ........................................ 475/11; 475/10; 475/332; 475/343; 118/730
[58] Field of Search ................... 475/11, 332, 343, 10; 118/730, 731

[56] References Cited

U.S. PATENT DOCUMENTS

| | | | |
|---|---|---|---|
| 1,824,325 | 9/1931 | Bregnet | 475/11 X |
| 2,528,963 | 11/1950 | Looney | 475/11 X |
| 2,676,436 | 4/1954 | Zampieri | 475/11 X |
| 3,858,547 | 1/1975 | Bergfelt | 118/730 |
| 4,034,704 | 7/1977 | Wössner et al. | 118/730 |
| 4,485,759 | 12/1984 | Brandolf | 118/503 |
| 4,697,929 | 10/1987 | Muller | 475/11 X |
| 4,816,133 | 3/1989 | Barnett | 118/730 X |
| 4,951,604 | 8/1990 | Temple et al. | 118/730 X |

FOREIGN PATENT DOCUMENTS

| | | |
|---|---|---|
| 813544 | 9/1951 | Fed. Rep. of Germany . |
| 1521250 | 5/1969 | Fed. Rep. of Germany . |
| 2448023 | 6/1975 | Fed. Rep. of Germany . |
| 2635008 | 2/1977 | Fed. Rep. of Germany ...... 118/730 |
| 1286819 | 8/1972 | United Kingdom . |

OTHER PUBLICATIONS

Leybold Brochure 12-280.02, "A 1100 High-Vacuum Coating System for Superior Quality Optics".
Leybold Brochure 12-210.02, "A 700-Family High--Vacuum Coating Systems for Precision Optics".

*Primary Examiner*—Richard Lorence
*Assistant Examiner*—David E. Henn
*Attorney, Agent, or Firm*—Felfe & Lynch

[57] ABSTRACT

Planetary gear system including one set of gearwheels 11, in particular for devices for coating substrates 3, 3', ... in a high-vacuum coating chamber where a drive shaft 9 supported and guided in a stationary bearing 1A is provided with a radially extending carrier plate 10 for planets and where the main axis of the stationary sun gear 8 coincides with the rotating axis of the drive shaft 9 and engages the set of gearwheels, wherein the bearing cage, which includes a top plate 27 and a bottom plate 28, via an axis 23 extending parallel to the rotating axis, engages an opening 16, the latter being provided in an area which is located radially inside the carrier plate 10 and wherein the drive shaft 26 of the set of gearwheels 11 is supported and guided in a slot 17 which is in area radially on the outside of the carrier plate 10 and emerges out of the carrier plate 10 parallel tot he rotating axis.

8 Claims, 8 Drawing Sheets

PLANETARY GEAR SYSTEM WITH A SET OF GEARS, PARTICULARLY FOR DEVICES FOR COATING SUBSTRATES

The invention relates to a planetary gear system including one set of gearwheels where the driving pinion can be coupled to the drive shaft and engages the sun gear and where the driving pinion is connected to a shaft that can be turned, in particular for apparatus for coating substrates in a high-vacuum coating chamber.

Several devices for coating substrates in a high-vacuum chamber are known which preferably include a planetary gear system (DE-AS 1 521 250, DE-OS 24 48 023, U.S. Pat No. 4,485,759). These devices as well as other known planetary systems (Leybold brochures 12-210.01 and 12-280.01) are distinguished by the fact that they essentially comprise a discoidal or annular support frame at which the substrate carriers are rotatably supported in a manner similar to the arrangement of planets.

These known devices and/or planetary systems have the significant disadvantage of being designed only for a defined number of planets to which their driving is also limited. The largest possible planet diameter is determined in dependency upon the number of planets selected for a coating apparatus. Number and diameter of the planets are thus predetermined for a coating apparatus and can only be changed by replacing the apparatus and/or the planetary system.

Since the devices and/or systems described here are used as substrate holders and rotating devices for the large-scale coating of cold-light mirrors, for example, or in ophthalmic optics, it is necessary that the substrate holders have maximum charging capacity and shortest possible set-up times. The geometry of the substrate to be coated determines the requirements to be satisfied by the necessary devices. First, this involves reoccurring time expenditures and financial investments regarding design and manufacture of the device and, further, it requires structural modifications or replacements of the device inside the coating apparatus.

It is an object of the invention to provide a device and/or a planetary system which is of such an universal applicability that it can be employed in different types of coating apparatus as well as used for the most various substrate types. This means that at a variable setting angle of the planet axis, a variable number of planets and a maximum planet diameter must be available for use.

This object is accomplished in accordance with the invention in that a drive shaft, supported and guided in a stationary bearing, is provided with a radially extending planet carrier plate. The main axis of the stationary sun gear coincides with the rotating axis of the drive shaft and engages a set of gearwheels. The bearing cage thereof, which comprises a lower and an upper plate, engages, via an axis extending parallel to the rotational axis, an opening provided in an area radially inside the carrier plate. The drive shaft of the set of gearwheels is supported and guided in a slot in an area radially at the outside in the carrier plate. In order to drive the substrate parallel to the rotating axis is allowed to extend out of the carrier plate.

This described planetary gear system has an arrangement of slots extending radially on the planet carrier plate and also has on a circle which is concentric with the drive shaft bores which permit, in combination with the set of gearwheels, an advantageous universal adjustment of the gear system such that at a variable setting angle of the planet axis, a variable number of planets with the respective greatest possible planet diameter is also possible. This invention allows the setup of the planetary gear system to be changed in a simple, easy and fast manner so as to meet the various geometric requirements of the substrates and/or the coating apparatus itself.

Figure 2:
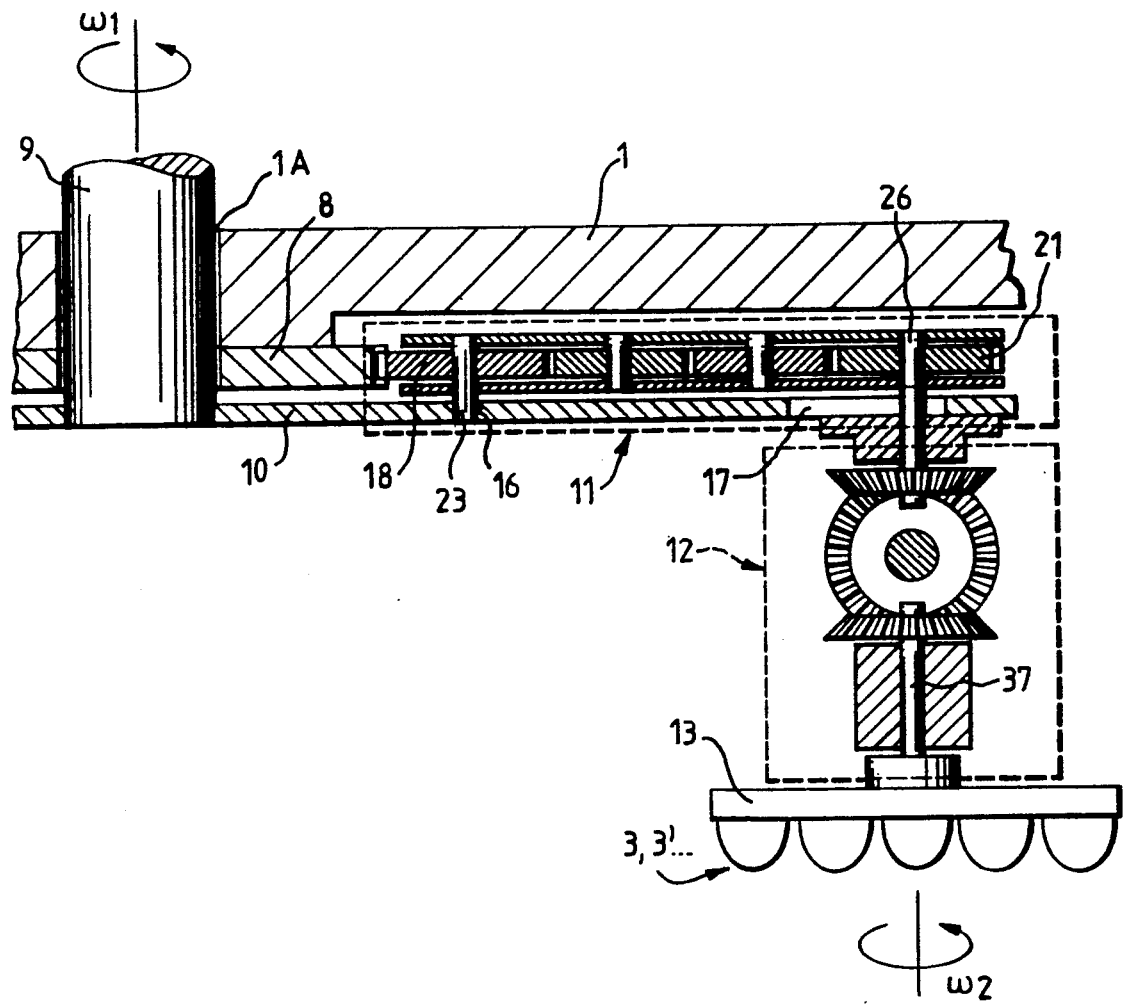
Figure 3:
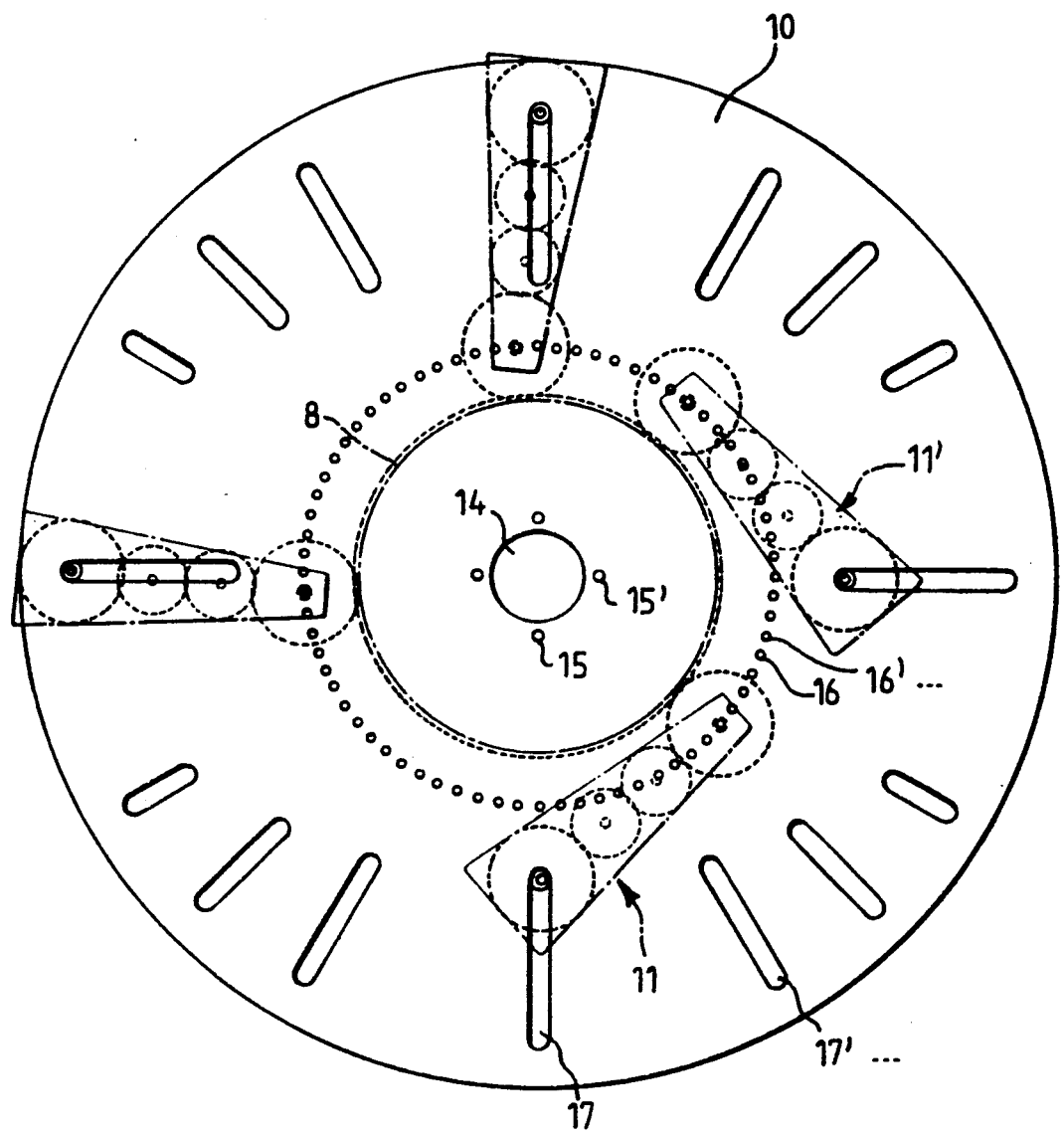
Figure 4:
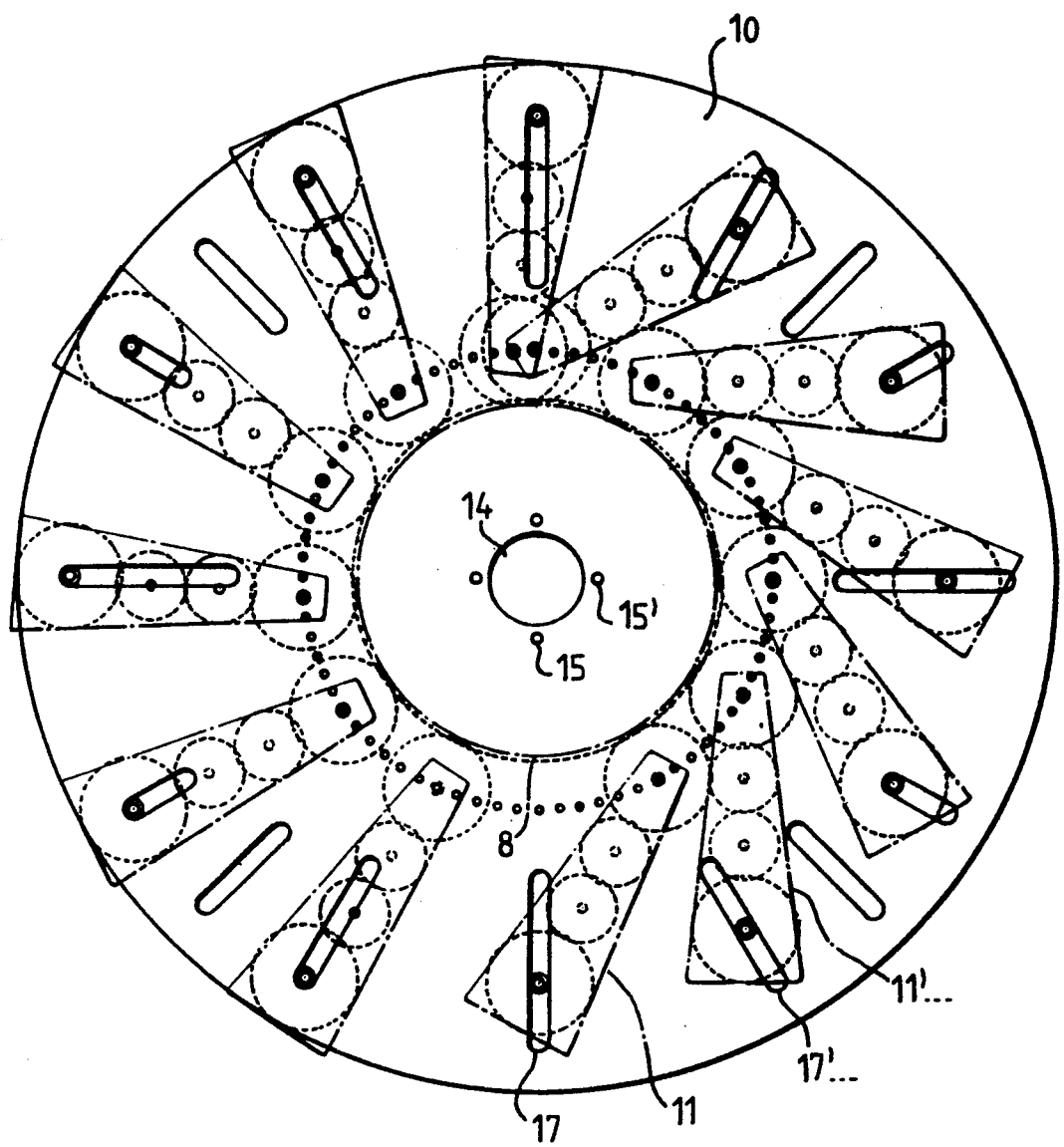
Figure 5:
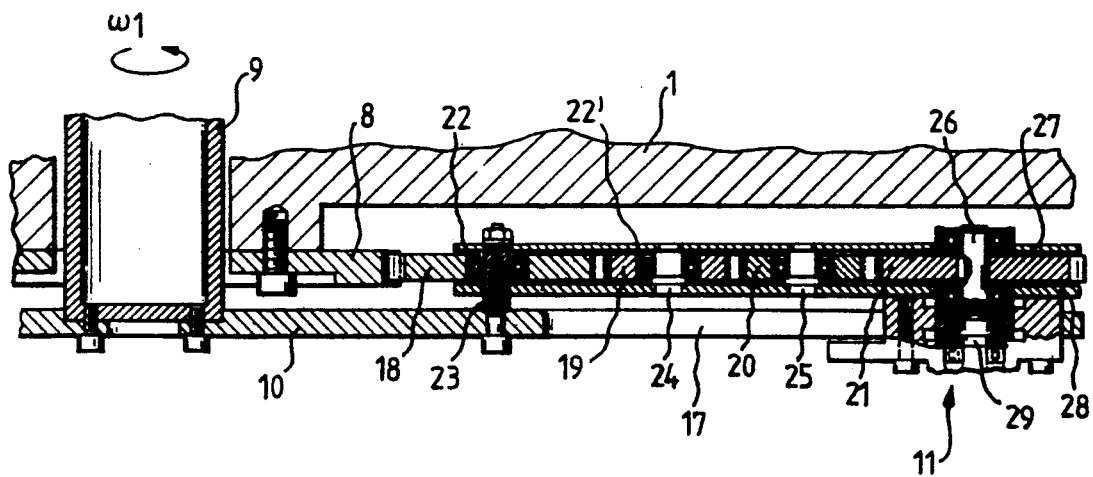
Figure 6:
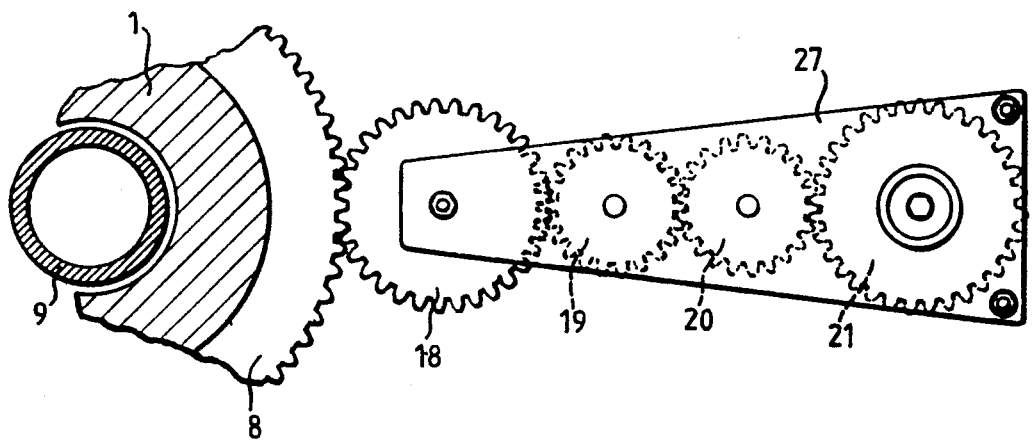
Figure 7:
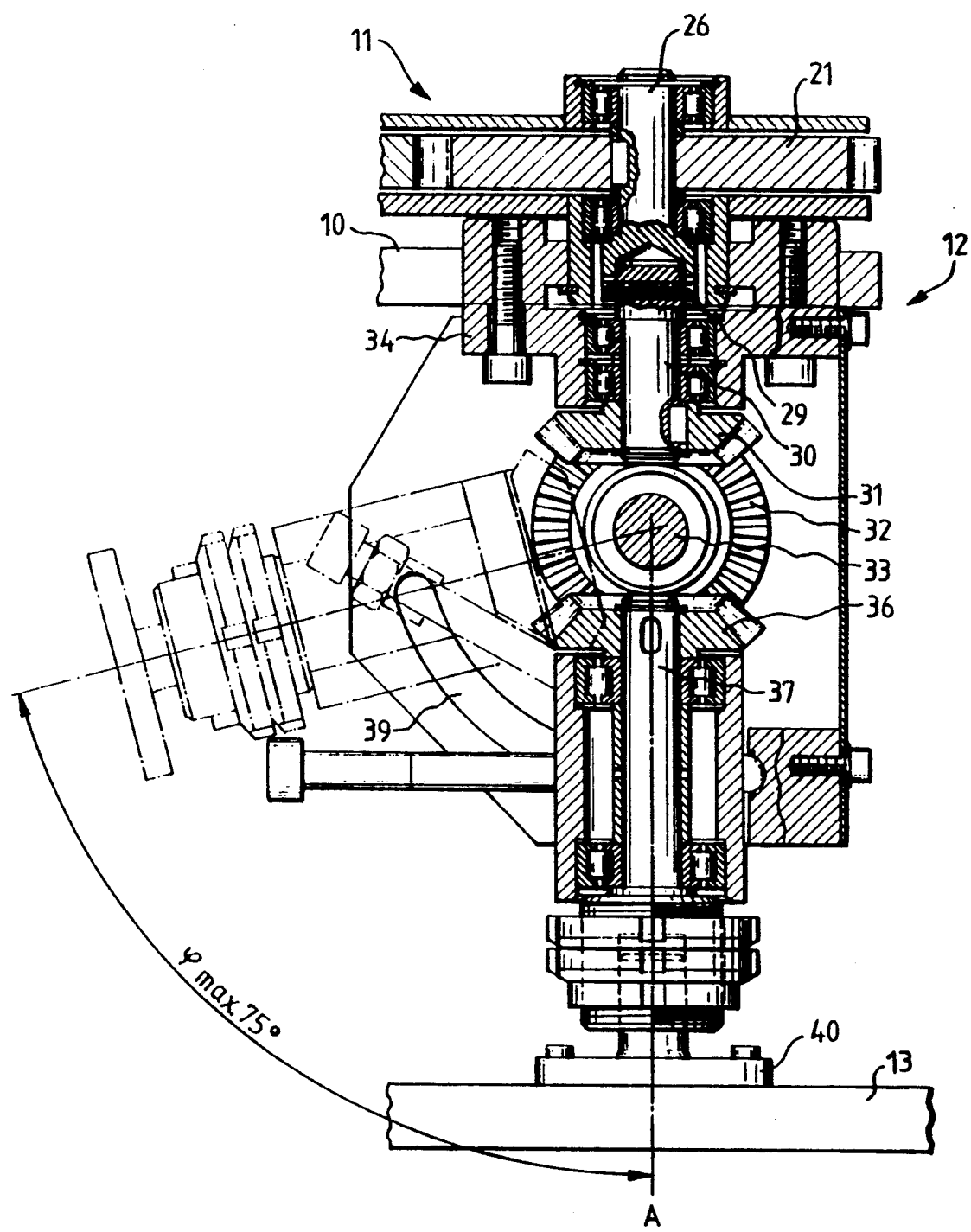
Figure 8:
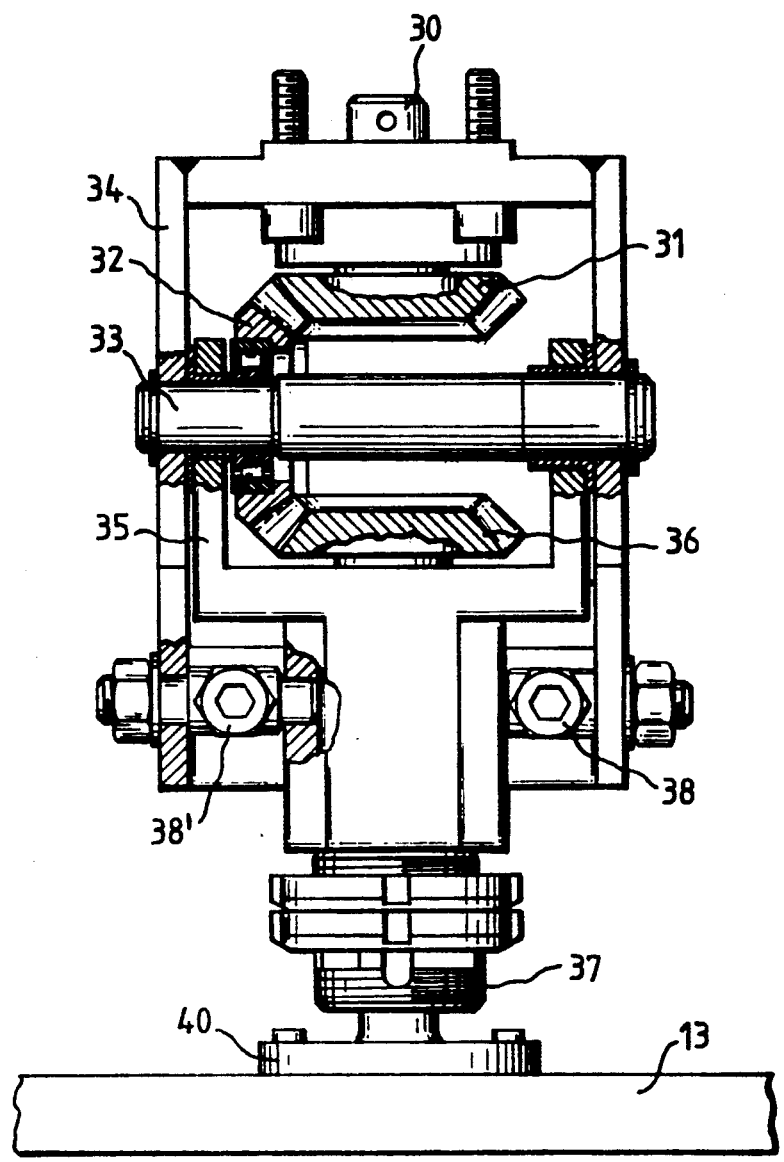
Figure 9:
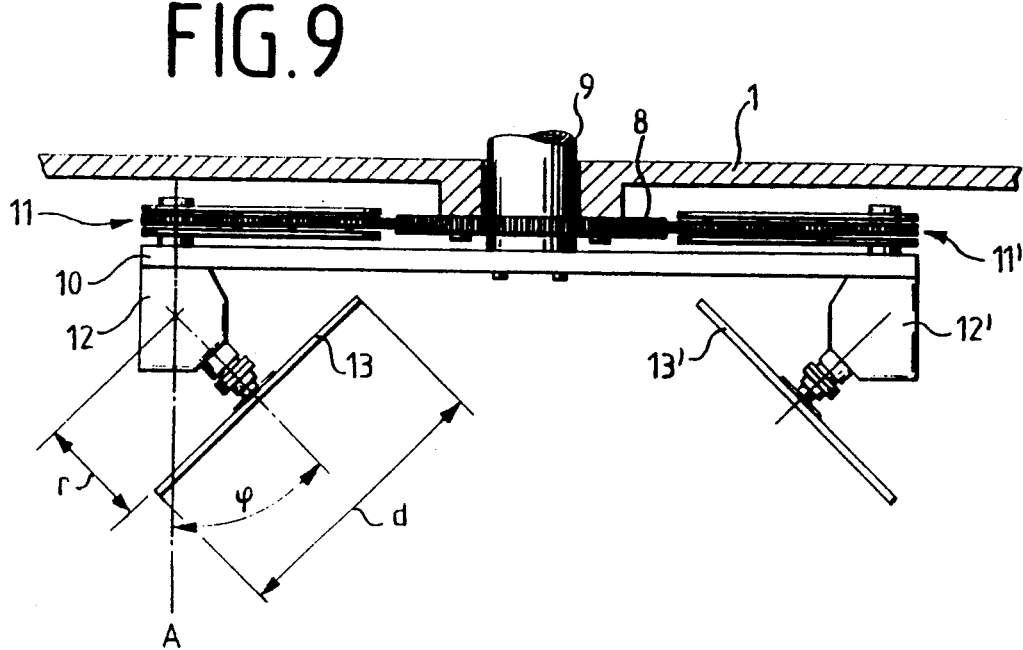
Figure 10:
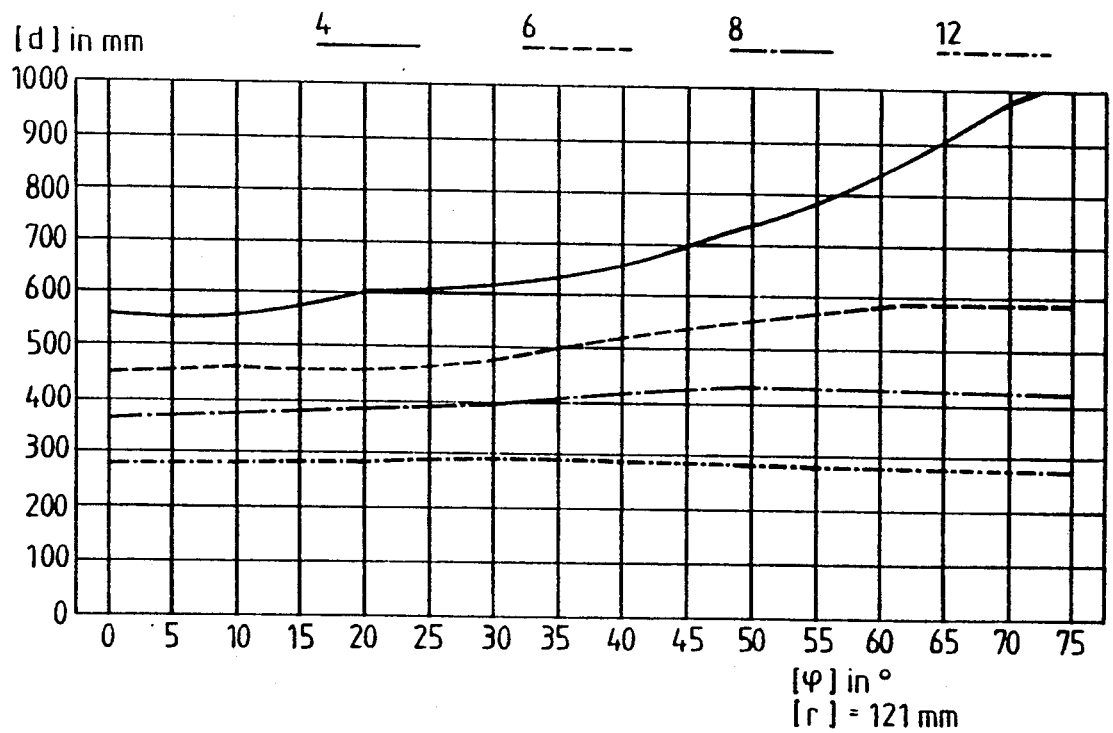

The invention allows the most various embodiments; The principle is illustrated in further detail in the attached drawings wherein FIG. 1 is a diagrammatic representation of a side view of a device for coating workpieces essentially comprising a coating chamber with a coating source, a planetary gear and a vacuum pump support, FIG. 2 is a cross section of a part of the planetary gear system essentially comprising a carrier plate for the planets, a set of gearwheels —hereinafter referred to as equalizer gear —and a turning gear, FIG. 3 is, in a reduced representation, a top view of a planet carrier including an equalizer gear for four planets, FIG. 4 is, in a reduced representation, a top view of a planet carrier including an equalizer gear for twelve planets, FIG. 5 is a cross section of a part of a planet carrier including an equalizer gear according to FIG. 2, FIG. 6 is top view of a equalizer gear according to FIG. 5, FIG. 7 is a cross section of a turning gear, FIG. 8 is a side view of a turning gear according to FIG. 7, FIG. 9 is a system diagram to elucidate the definitions of FIG. 10, FIG. 10 is a chart representing of the various possibilities of configuring a planetary gear system.

As seen in FIG. 1, a coating source 2 is disposed in a vacuum coating chamber 1 in such a way that the substrates 3, 3', ... to be coated can be moved over across the coating source 2. Inside the chamber 1, these substrates are mounted to a planetary gear system 4 such that they can be rotated. A valve 5 and a vacuum line 6 connect the vacuum chamber to the vacuum pump support 7. The planetary gear system (FIG. 2) includes a sun gear 8 mounted in the coating chamber 1, a drive shaft 9 which centrically passes through the sun gear 8 and a discoidal, rotating planet carrier plate 10 which is firmly connected thereto. Mounted to this plate in turn are the equalizer gear 11 and the turning gear 12 which rotate around the non-moving sun gear 8. The substrate holder 13,—hereafter called planet —which serves to hold the substrates 3, 3', ... to be coated, is attached to the turning gear.

The function can be described as follows:

A motor, not represented in further detail, is connected to the drive shaft 9 turning the latter at an angular velocity $\omega_1$. The planet carrier 10 firmly attached to the shaft 9 by means of screws consequently rotates at the same angular velocity $\omega_1$ as the shaft 9. The set of gearwheels 11 of FIG. 2, which includes four gearwheels, is mounted onto the planet carrier plate 10 and consequently rotates around the non-moving sun gear 8. Since the gearwheels of the equalizer gear permanently engage one another, an angular velocity $\omega_2$ occurs at the outer one 21 of the set of gearwheels 11. The turning gear 12 connected to the equalizer gear 11, hence executes a rotating movement relative to the carrier plate 10 for the planets.

The carrier plate 10 (FIG. 3) for the planets is a circular disc with a central bore 14 for the passage of the drive shaft 9 and the corresponding mounting bores 15, 15', ... Bores on a circular line with a defined number of bores 16, 16', ... as well as radially extending slots 17, 17', ... of various lengths serve to hold the equalizer gear 11, 11', ... on the carrier plate 10 for the planets. They thus allow the use of a variable number of planets and a variable selection of a partial circle where there is the rotating axis of the respective outer gearwheel 21 of the set of wheels 11, 11', ...

Position and length of the slots 17, 17', ... depend upon the maximum number and the geometry of the wheel sets 11, 11', ...

FIG. 3 shows an example where a total of four sets of gearwheels 11, 11', ... is used with the maximum partial circle diameter on the left side of the drawing and the minimum partial circle diameter on the right side of the drawing.

Together with the roller bearings 22, 22', ... shafts 23, 24, 25 as well as the shaft 26, the gearwheels 18, 19, 20, and 21 of the set of wheels 11 (FIG. 5) are installed between the upper plate 27 and the lower plate 28. This complete unit is firmly attached to the planet carrier 10 by means of screws and, driven by the drive shaft 9, it rotates around the sun gear 8 at an angular velocity $\omega_1$.

The gearwheels 18 to 21 of the equalizer gear 11 permanently engage one another and the sun gear 8 (FIG. 6).

The outer gearwheel 21 of the set of gearwheels 11, i.e. the one on the output side, is mounted onto a shaft 26 which shaft by means of a dowel pin 29, is corotationally connected to the shaft 30 of the turning gear 12 (FIG. 7). The main direction of the drive shaft 37 and, hence, the setting angle of the planet 13 are variable. The latter can be continuously adjusted at any desired angle $\phi$ between the main axis A of the shaft 30 and up to a maximum of 75° of this axis. The illustration in broken lines of FIG. 7 represents the maximum turning angle of the planet.

A conical gearwheel 31 is mounted onto the input shaft 30. It permanently engages a corresponding conical gearwheel 32 which is mounted onto a shaft 33 where the longitudinal axis of symmetry thereof extends perpendicularly to the longitudinal axis of the input shaft 30 and which is characterized in that both shafts 30 and 33 are mounted onto a common, welded frame 34 (FIG. 8).

Between the two sides of the U-like frame 34, there is a Y-like turning arm 35. The latter is supported such that it can rotate around the shaft 33. A third conical gearwheel 36 is mounted in the turning arm 35 such that it permanently meshes with the conical gearwheel 32. The turning arm 35 can be arrested by means of setscrews 38, 38' (FIG. 8) which are guided in arcuate slots 39, 39' (FIG. 7) in the frame 34.

A flange 40 which serves to hold the substrate holder 13 —of the planet —is attached to the outer, free end of the output shaft 37 of the turning gear 12.

Geometry and position of the planet 13, 13', ... is determined by the following measures of length and angle (FIG. 9):

r is the turning radius of the turning gear 12 in (mm),
d is the diameter of the planet and/or the substrate holder 13 in (mm),
$\phi$ is the turning angle of the planet and/or the angle between the main axis A of the input shaft of the turning gear 12 and the one of the drive shaft in angular degrees (°).

FIG. 10 is an example of several possible variations which can be realized by using this planetary gear system. It also illustrates the essential advantages of a variable system over a rigid system which has no adjustment options. First, there are different numbers of planets. The representation shows four variants with 4, 6, 8, and 12 planets. For each individual variant, it is now possible to select various planetary turning angles $\phi$ at a constant turning radius of the turning gear of r=121 mm.

The range of use for this example is given from 0° to 75°. For each individual variant of the number of planets, the characteristic curve of FIG. 10 now allows determining the largest possible diameter of the substrate carrier —of the planets —as a function of the selected angle $\phi$.

The broadest variations with respect to the diameter d of the planets are seen in the uppermost continuous curve —the embodiment with four planets.

In this example, the planet diameters d range between approximately 550 mm at $\phi=0°$ and 1000 mm at $\phi=75°$, at a maximum.

The bottom dot-dash curve shows only few possible variations; this is the embodiment with twelve planets. The maximum planet diameter d in this example lies in a very small range between approximately 260 to 290 mm.

The remaining variants with 6 and 8 planets are found in the area between the two above curves.

| Listing of individual parts. | |
|---|---|
| 1 | vacuum coating chamber |
| 1A | bearing |
| 2 | coating source |
| 3, 3', ... | substrate |
| 4 | planetary gear system |
| 5 | valve |
| 6 | vacuum line |
| 7 | vacuum pump support |
| 8 | sun gear |
| 9 | drive shaft |
| 10 | carrier plate for planets |
| 11, 11', ... | equalizer gear, set of gearwheels |
| 12, 12', ... | turning gear |
| 13, 13', ... | substrate holder, planet |
| 14 | bore |
| 15, 15', ... | bore |
| 16, 16', ... | bore, opening |
| 17, 17', ... | slot |
| 18 | gearwheel, driving pinion |
| 19 | gearwheel |
| 20 | gearwheel |
| 21 | gearwheel, driving pinion |
| 22, 22', ... | roller bearing |
| 23 | axis |
| 24 | axis |
| 25 | axis |
| 26 | drive shaft |
| 27 | upper plate |
| 28 | lower plate |
| 29 | dowel pin |
| 30 | input shaft |
| 31 | conical gearwheel |
| 32 | conical gearwheel |
| 33 | shaft |
| 34 | frame |
| 35 | turning arm |
| 36 | conical wheel |
| 37 | output shaft |
| 38, 38', ... | setscrew |

| Listing of individual parts. | |
|---|---|
| 39, 39', ... | guide slots |
| 40 | flange |

| Definitions | |
|---|---|
| $\omega_1$ | angular velocity of the drive shaft |
| $\omega_2$ | angular velocity of the drive shaft |
| A | main axis |
| $\phi$ | turning angle of planets |
| r | radius |
| d | diameter of planets |

We claim:

1. A planetary gear system comprising:

a sun gear;

a first drive shaft;

at least one set of gearwheels, each set of gearwheels including a first driving pinion coupled to the first drive shaft and engaging the sun gear, and a second driving pinion drivingly connected to the first driving pinion and to a first shaft which is turned in a high-vacuum chamber;

a stationary bearing, the first drive shaft being supported and guided by the stationary bearing;

said first drive shaft also having mounted nonrotatably thereon a radially extending carrier plate for the at least one set of gearwheels;

the sun gear being stationary and having a main axis coinciding with an axis of rotation of the first drive shaft and engaging the at least one set of gearwheels;

each of said at least one set of gearwheels having a bearing cage comprising a top plate and a bottom plate, and a second shaft extending parallel to the axis of rotation of the first shaft;

an opening disposed at a radially inner portion of the carrier plate, said second shaft being disposed in the opening;

at least one slot in the carrier plate in an area of the carrier plate which is in a radially outer portion of the carrier plate, there being at least as many slots as sets of gearwheels;

each set of gearwheels further comprising a second drive shaft emerging out of the carrier plate through a corresponding at least one slot parallel to the axis of rotation of the first drive shaft.

2. A planetary gear system in accordance with claim 1 in which the carrier plate for the at least one set of gearwheels has a central bore for the first drive shaft and wherein a plurality of said openings are located on a circular line concentric with the central bore, for holding the second shaft of a respective one of said sets of gearwheels and in which the carrier plate also has a plurality of said slots in a fan-like arrangement for guiding the second drive shaft of a respective one of said sets of gearwheels.

3. A planetary gear system according to claim 1 in which the at least one set of gearwheels permanently engages the sun gear.

4. A planetary gear system in accordance with claim 3 in which the carrier plate for the at least one set of gearwheels is driven by the first drive shaft and in which the first driving pinion of each of the at least one set of gearwheels consequently rotates around the stationary sun gear.

5. A planetary gear system according to claim 1 wherein a turning gear engages the second drive shaft of each of the at least one set of gearwheels.

6. A planetary gear system in accordance with claim 5 wherein each turning gear comprises an input shaft drivingly connected to the first shaft, which serves as an output shaft, supported in such a way that an axis of rotation of the first shaft can be turned with respect to an axis of rotation of the input shaft.

7. A planetary gear system in accordance with claim 6 wherein a substrate holder is coupled nonrotatably to each first shaft thus rotating therewith.

8. A planetary gear system according to claim 1 in which a material of the gearwheels is a combination of noble steel and bronze.

* * * * *